United States Patent [19]

Corsmeier et al.

[11] Patent Number: 5,056,988
[45] Date of Patent: Oct. 15, 1991

[54] BLADE TIP CLEARANCE CONTROL APPARATUS USING SHROUD SEGMENT POSITION MODULATION

[75] Inventors: Robert J. Corsmeier, Cincinnati; Wu-Yang Tseng, West Chester, both of Ohio

[73] Assignee: General Electric Company, Cincinnati, Ohio

[21] Appl. No.: 480,198

[22] Filed: Feb. 12, 1990

[51] Int. Cl.$^5$ .............................................. F01D 11/08
[52] U.S. Cl. .............................. 415/173.2; 415/126; 415/174.1
[58] Field of Search ............ 415/126, 127, 148, 173.1, 415/173.2, 173.3, 174.1, 174.2, 134, 136; 416/191

[56] References Cited

U.S. PATENT DOCUMENTS

| | | | |
|---|---|---|---|
| 3,039,737 | 6/1962 | Kothoff, Jr. ........................ | 253/39.1 |
| 3,062,497 | 11/1962 | Howes et al. ........................ | 253/39 |
| 3,085,398 | 4/1963 | Ingleson ........................ | 60/39.32 |
| 3,520,635 | 7/1970 | Killmann et al. ..................... | 415/138 |
| 3,623,736 | 11/1971 | Petrie et al. .......................... | 277/27 |
| 3,740,168 | 6/1973 | Hug et al. ............................ | 415/126 |
| 3,966,354 | 12/1974 | Patterson ............................ | 415/116 |
| 4,005,946 | 6/1975 | Brown et al. ........................ | 415/136 |
| 4,050,843 | 9/1977 | Needham et al. ..................... | 415/116 |
| 4,230,436 | 10/1980 | Dauson ................................ | 415/1 |
| 4,264,274 | 4/1981 | Benedict .......................... | 415/199.5 |
| 4,330,234 | 5/1982 | Colley ................................ | 415/173.2 |
| 4,332,523 | 6/1982 | Smith ................................ | 415/126 |
| 4,343,592 | 8/1982 | May ................................... | 415/173.2 |
| 4,384,819 | 5/1983 | Baker ..................................... | 415/14 |
| 4,419,044 | 12/1983 | Barky et al. ........................... | 415/117 |
| 4,632,635 | 12/1986 | Thoman et al. ........................ | 415/14 |
| 4,657,479 | 4/1987 | Brown et al. ........................ | 415/138 |
| 4,683,716 | 8/1987 | Wright et al. ....................... | 60/226.1 |
| 4,714,404 | 12/1987 | Lardellier ........................... | 415/127 |
| 4,773,817 | 9/1988 | Stangalini ............................. | 415/48 |

FOREIGN PATENT DOCUMENTS

| | | | |
|---|---|---|---|
| 0038617 | 3/1977 | Japan ................................. | 415/126 |
| 0761829 | 11/1956 | United Kingdom ................ | 415/126 |
| 2068470 | 8/1981 | United Kingdom . | |
| 2108591 | 5/1983 | United Kingdom ................ | 415/127 |
| 2199664 | 7/1988 | United Kingdom . | |

OTHER PUBLICATIONS

Technical Report AFAPL-TR-79-2087 entitled, "Thermal Response Turbine Shroud Study", by E. J. Kawecki of Pratt & Whitney; Jul. 1979.

*Primary Examiner*—Edward K. Look
*Assistant Examiner*—Christopher M. Verdier
*Attorney, Agent, or Firm*—Jerome C. Squillaro

[57] ABSTRACT

A clearance control apparatus has a pair of positioning mechanisms for quickly controlling the clearance between rotor blade tips and a shroud segment of a gas turbine engine casing. The positioning mechanisms are supported by axially-spaced casing bosses, coupled to the shroud segment via a shroud holder, and actuatable for moving radially between inner and outer stops. As the positioning mechanisms are moved between the inner and outer stops, the shroud segment is moved therewith toward and away from the rotor axis to respective inner and outer positions relative to the rotor at which corresponding desired minimum and maximum clearances are established between the shroud segment and rotor blade tips. A fluid cylinder on the casing has a piston coupled to the positioning mechanisms by a link. The cylinder is operable for actuating the positioning mechanisms to move solely to one or the other of the inner and outer stops and cause the shroud segment to move solely to one or the other of the inner and outer positions thereof to corresponding solely provide one or the other of the minimum and maximum clearances between the shroud segment and rotor blade tips.

22 Claims, 4 Drawing Sheets

BLADE TIP CLEARANCE CONTROL APPARATUS USING SHROUD SEGMENT POSITION MODULATION

RIGHTS OF THE GOVERNMENT

The U.S. Government has rights in this invention pursuant to Contract No. F33615-87-C-2764 awarded by the Department of the Air Force.

CROSS-REFERENCE TO RELATED APPLICATIONS

Reference is hereby made to the following copending U.S. patent applications dealing with related subject matter and assigned to the assignee of the present invention:

1. "Blade Tip Clearance Control Apparatus For A Gas Turbine Engine" by John J. Ciokajlo, assigned U.S. Ser. No. 405,369 and filed Sep. 8, 1989.

2. "Mechanical Blade Tip Clearance Control Apparatus For A Gas Turbine Engine" by John J. Ciokajlo et al, assigned U.S. Ser. No. 404,923 and filed Sep. 8, 1989.

3. "Blade Tip Clearance Control Apparatus Using Bellcrank Mechanism" by Robert J. Corsmeier et al, assigned U.S. Ser. No. 440,633 and filed Nov. 22, 1989.

4. "Blade Tip Clearance Control Apparatus Using Cam-Actuated Shroud Segment Positioning Mechanism" by Robert J. Corsmeier et al, assigned U.S. Ser. No. 482,139 and filed Feb. 20, 1990.

BACKGROUND OF THE INVENTION

1. Field of the Invention

The present invention relates generally to gas turbine engines and, more particularly, to an apparatus for controlling clearance between adjacent rotating and non-rotating components of a gas turbine engine.

2. Description of the Prior Art

The efficiency of a gas turbine engine is dependent upon many factors, one of which is the radial clearance between adjacent rotating and non-rotating components, such as, the rotor blade tips and the casing shroud surrounding the outer tips of the rotor blades. If the clearance is too great, an unacceptable degree of gas leakage will occur with a resultant loss in efficiency. If the clearance is too little, there is a risk that under certain conditions contact will occur between the components.

The potential for contact occurring is particularly acute when the engine rotational speed is changing, either increasing or decreasing, since temperature differentials across the engine frequently result in the rotating and non-rotating components radially expanding and contracting at differ rates. For instance, upon engine accelerations, thermal growth of the rotor typically lags behind that of the casing. During steadystate operation, the growth of the casing ordinarily matches more closely that of the rotor. Upon engine decelerations, the casing contracts more rapidly than the rotor.

Control mechanisms, usually mechanically or thermally actuated, have been proposed in the prior art to maintain blade tip clearance substantially constant. However, none are believed to represent the optimum design for controlling clearance. Thus, a need still remains for an improved mechanism for clearance control that will improve engine performance and reduce fuel consumption.

SUMMARY OF THE INVENTION

The present invention provides a blade tip clearance control apparatus which satisfies the aforementioned needs and achieves the foregoing objectives. The blade tip clearance control apparatus employs a shroud segment positioning mechanism having components which achieves these objectives without a large increase in weight. The positioning mechanism is operable to maintain minimum rotor blade tip-shroud clearance during steady state operation, thereby improving engine performance. Also, the positioning mechanism is operable to adjust as quickly as an operating transient occurs for preventing excessive rubs during any transient operation of the engine. Further, the components of the positioning mechanism are located outside the casing for easy maintenance, and are few in number and easy to manufacture and assemble.

Accordingly, the clearance control apparatus of the present invention is provided in a gas turbine engine which includes a rotatable rotor having a central axis and a row of blades with tips and a stationary casing, with a shroud, disposed in concentric relation with the rotor. The clearance control apparatus, operable for controlling the clearance between the rotor blade tips and the casing shroud, comprises: (a) a shroud segment defining a circumferential portion of the casing shroud and being separate from and spaced radially inwardly of the casing; (b) at least one mounting structure on the stationary casing defining a passage between exterior and interior sides of the casing, the mounting structure being spaced radially outwardly from the shroud segment; (c) a shroud segment positioning mechanism supported by the mounting structure, coupled to the shroud segment, and being actuatable for moving the shroud segment toward and away from the rotor axis to respective inner and outer positions relative to the rotor at which corresponding desired maximum and minimum clearances are established between the shroud segment and rotor blade tips; and (d) means coupled to the positioning mechanism and being operable for actuating the positioning mechanism to move the shroud segment solely to one or the other of the inner and outer positions thereof.

More particularly, the positioning mechanism includes a support member mounted through the passage defined by the mounting structure for radial movement relative to the mounting structure and toward and away from the rotor axis. The support member has an inner end portion coupled to the shroud segment at the interior side of the casing. The positioning mechanism also includes means for defining inner and outer stops being coupled to the mounting structure and to the outer end portion of the support member and located at the exterior side of the casing.

Further, the inner and outer stop defining means includes an annular member adjustably attached to the mounting structure and extending through the passage thereof, and an annular collar member adjustably attached to the annular member. Also, the inner and outer stop defining means includes an annular abutment member attached to the support member and adjustably movable radially therealong and relative to the mounting structure, and means in the form of a coil spring disposed between the abutment member and the annular member for biasing the support member and the shroud segment therewith to its outer position in which the shroud segment is provided at maximum clearance with the rotor blade tips.

The annular member includes a tubular body which defines an interior bearing surface slidably engaged by the support member, and an annular flange which defines an inner stop. The flange is attached to and projects outwardly from the outer end of the tubular body. The annular member is adjustably movable radially relative to the mounting structure for presetting the location of the inner stop.

The collar member has an annular outer rim spaced from the annular flange of the annular member and defining an outer stop. The collar member is adjustably movable radially relative to the flange for presetting the location of the outer stop. The annular abutment member is attached to the support member and adjustably movable radially therealong and relative to the mounting structure for presetting the point at which the abutment member engages the inner and outer stops and thereby for presetting the minimum and maximum clearances between the shroud segment and rotor blade tips. The coil spring yieldably biases the abutment member and thereby the support member therewith to move away from the inner stop and toward the outer stop and thereby to move the shroud segment toward the outer position in which it is at maximum clearance with the rotor blade tips.

The actuating means of the apparatus includes a fluid cylinder attached on the stationary casing, and a piston mounted in the cylinder for movement between first and second radially-displaced positions. The actuating means also includes means for connecting a source of pressurized fluid to the cylinder and being operable for supplying pressurized fluid to the cylinder for moving the piston to one or the other of the first and second positions. A link connects the piston to the support member such that the support member is moved toward and away from the rotor axis and the shroud segment is moved therewith to the respective inner and outer positions by movement of piston to the respective first and second positions.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 1:
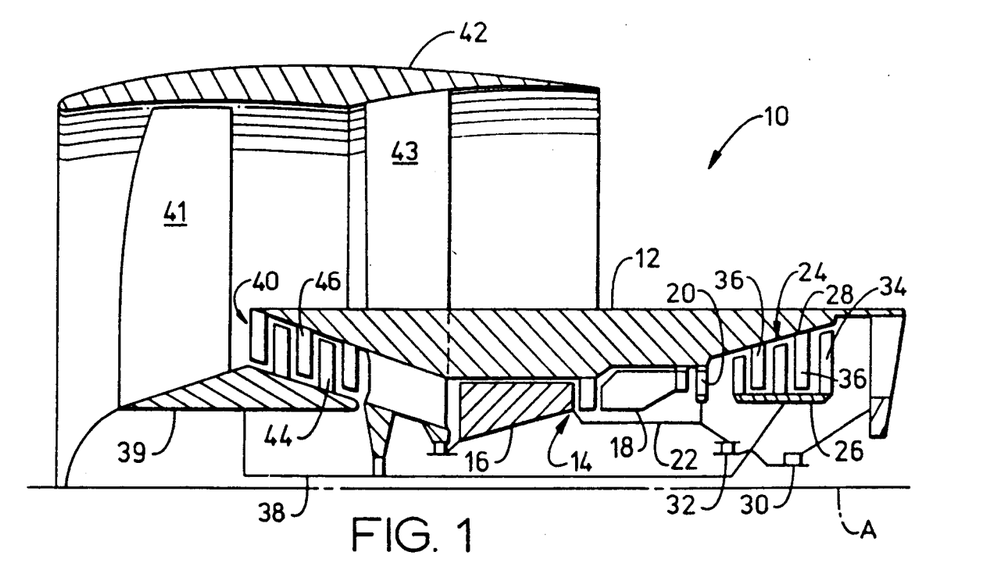
FIG. 1 is a schematic view of a gas turbine engine.

Referring now to the drawings, and particularly to FIG. 1, there is illustrated a gas turbine engine, generally designated 10, to which the present invention can be applied. The engine 10 has a longitudinal center line or axis A and an annular casing 12 disposed coaxially and concentrically about the axis A. The engine 10 includes a core gas generator engine 14 which is composed of a compressor 16, a combustor 18, and a high pressure turbine 20, either single or multiple stage, all arranged coaxially about the longitudinal axis or center line A of the engine 10 in a serial, axial flow relationship. An annular drive shaft 22 fixedly interconnects the compressor 16 and high pressure turbine 20.

The core engine 14 is effective for generating combustion gases. Pressurized air from the compressor 16 is mixed with fuel in the combustor 18 and ignited, thereby generating combustion gases. Some work is extracted from these gases by the high pressure turbine 20 which drives the compressor 16. The remainder of the combustion gases are discharged from the core engine 14 into a low pressure power turbine 24.

The low pressure turbine 24 includes an annular drum rotor 26 and a stator 28. The rotor 26 is rotatably mounted by suitable bearings 30 and includes a plurality of turbine blade rows 34 extending radially outwardly therefrom and axially spaced. The stator 28 is disposed radially outwardly of the rotor 26 and has a plurality of stator vane rows 36 fixedly attached to and extending radially inwardly from the stationary casing 12. The stator vane rows 36 are axially spaced so as to alternate with the turbine blade rows 34. The rotor 26 is fixedly attached to drive shaft 38 and interconnected to drive shaft 22 via differential bearings 32. The drive shaft 38, in turn, rotatably drives a forward booster rotor 39 which forms part of a booster compressor 40 and which also supports forward fan blade rows 41 that are housed within a nacelle 42 supported about the stationary casing 12 by a plurality of struts 43, only one of which is shown. The booster compressor 40 is comprised of a plurality of booster blade rows 44 fixedly attached to and extending radially outwardly from the booster rotor 39 for rotation therewith and a plurality of booster stator vane rows 46 fixedly attached to and extending radially inwardly from the stationary casing 12. Both the booster blade rows 44 and the stator vane rows 46 are axially spaced and so arranged to alternate with one another.

Clearance Control Apparatus of the Prior Art

Figure 2:
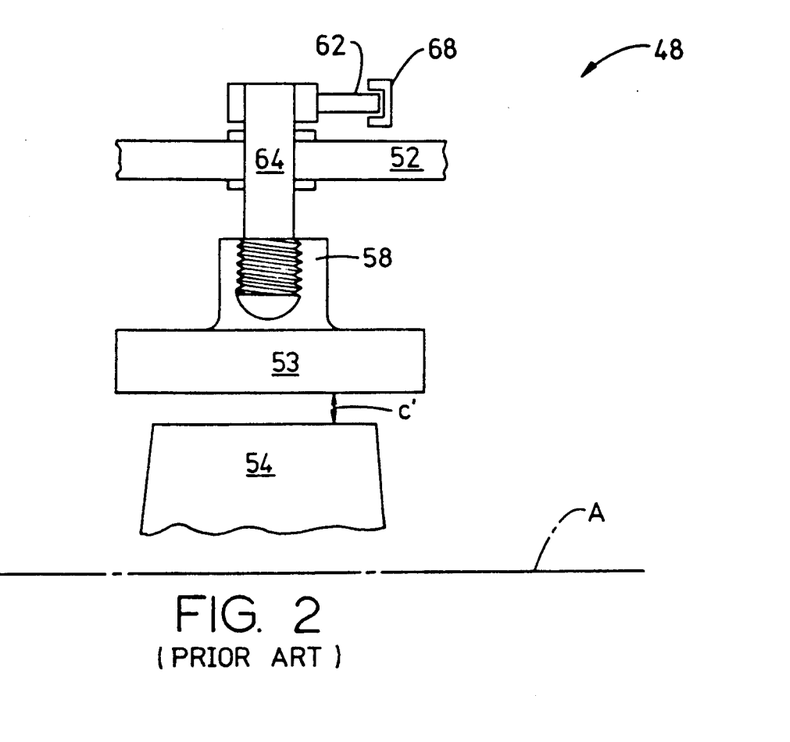
FIG. 2 is a longitudinal axial sectional view of one prior art mechanical apparatus for controlling rotor blade tip and stator casing shroud clearance.
Figure 3:
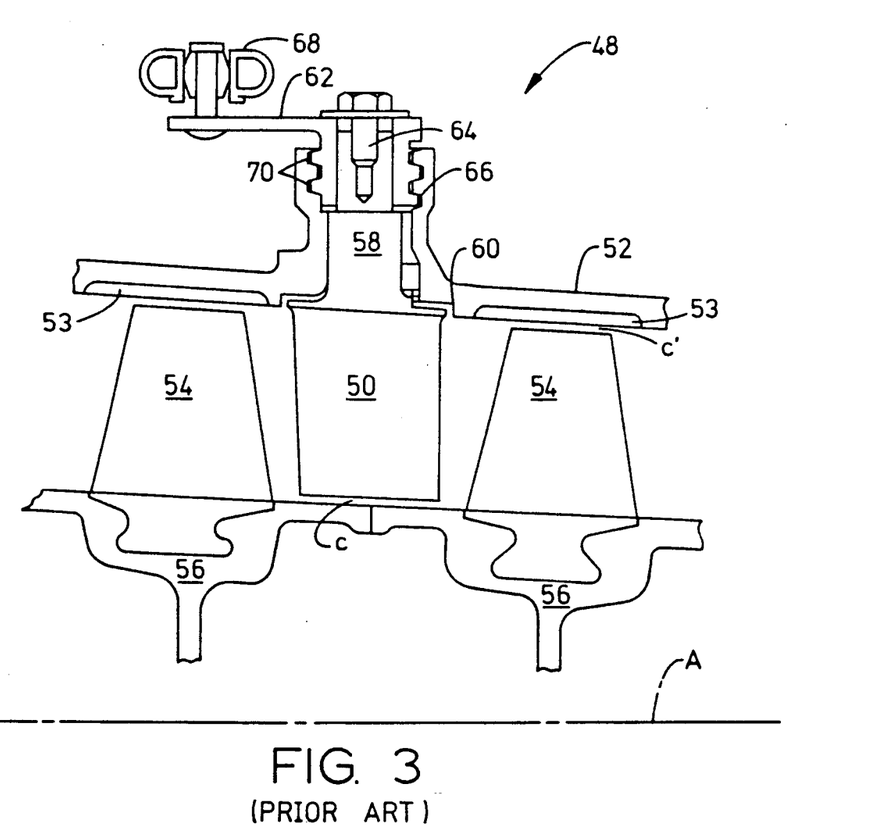
FIG. 3 is a longitudinal axial sectional view of another prior art mechanical apparatus for controlling rotor and stator vane tip clearance.
Figure 4:
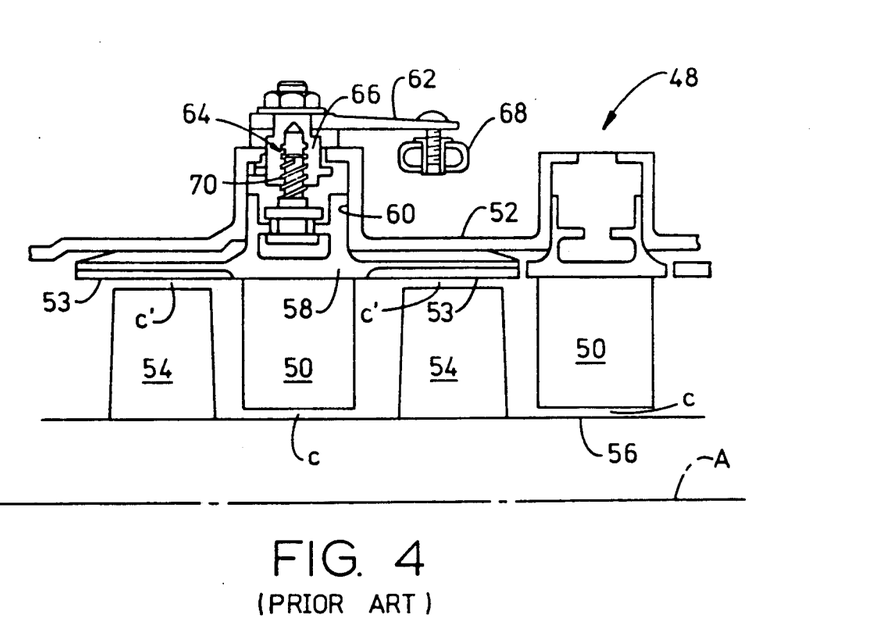
FIG. 4 is a longitudinal axial sectional view of yet another prior art mechanical apparatus for controlling rotor blade tip and stator casing shroud clearance and rotor and stator vane tip clearance.
Figure 5:
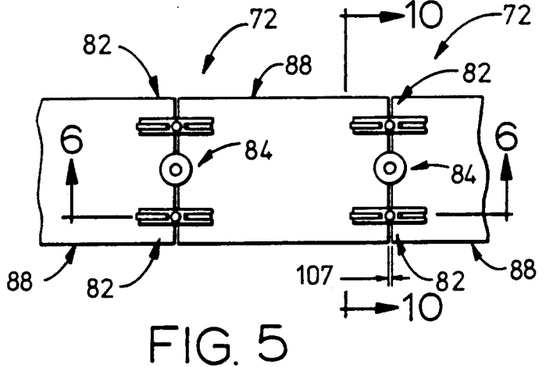
FIG. 5 is a schematical outer plan view of a blade tip clearance control apparatus in accordance with the present invention.

Referring now to FIGS. 2, 3 and 4, there is illustrated three variations of a prior art clearance control apparatus, generally designated 48 (disclosed on pages 8 and 15 of a publication entitled "Thermal Response Turbine Shroud Study" by E. J. Kawecki, dated July 1979, Technical Report AFAPL-TR-79-2087). The clearance control apparatus 48 is operable for changing the tip clearance gap C between the stator vanes 50, coupled on a stationary casing 52, and a rotatable rotor 56; and-/or, the tip clearance gap C' between the rotatable rotor blades 54 and the casing shroud 53 of a gas turbine engine, such as the engine 10 just described.

In the FIG. 2 embodiment, the shroud segment 53 is separate from the casing 52 and is mounted on the end of a screw 64 for radial movement relative to the casing 52 toward and away from the tip of the rotor blade 54 for adjustment of the clearance gap C' therebetween. In the FIGS. 3 and 4 embodiments, the stator vanes 50 are mounted on shanks 58 which, in turn, are disposed in openings 60 in the casing 52 for radial movement toward and away from the rotor 56. Each shank is coupled to a lever arm 62 by the screw 64 threaded into a fitting 66 attached to the casing 52. Also, a unison ring 68 upon circumferential movement rotates the screw 64 via the lever arm 62 in order to adjust the clearance gap. To reduce the effects of thermal expansion on the clearance control apparatus 48, each screw 64 has threads 70 of a square cross section. In each of these embodiments, the shroud segment 53 is attached to the stationary casing 52 with the shroud segment 53 being fixedly attached in the FIG. 3 embodiment and movably attached in the FIG. 4 embodiment.

It should be noted that in the FIG. 3 embodiment, the clearance control apparatus 48 operates to adjust the clearance gap C between the tip of the stator vane 50 and the rotor 56, but does not adjust the clearance gap C' between the tip of the rotor blade 54 and the shroud segment 53. However, in the FIG. 4 embodiment, operation of the clearance control apparatus 48 not only adjusts the clearance gap C between the tip of the stator vane 50 and the rotor 56, but also, simultaneously therewith, adjusts the clearance gap C' between the tip of the rotor blade 54 and the shroud segment 53.

Clearance Control Apparatus of Present Invention

Turning now to FIGS. 5-10, there is illustrated a mechanical clearance control apparatus, generally designated 72, in accordance with the present invention. This apparatus 72 can advantageously be used with all compressor and turbine rotors of a gas turbine engine, such as the engine 10 illustrated in FIG. 1, where the rotors have smooth shrouded outer flowpaths and where rotor blade tip to shroud operating minimum clearances are required over the operating range of the engine. Also, the clearance control apparatus 72 is applicable to either aircraft or land based gas turbine engines.

The clearance control apparatus 72 is operable for controlling the gap or clearance G between a stationary casing 74 and outer tips 76A of a plurality of blades 76 (shown in FIG. 10) of a rotor (not shown) which extend radially outwardly in alternating fashion between stator vanes (not shown) which, in turn, are stationarily attached to and extending radially inwardly from the casing 74. More particularly, a plurality of the clearance control apparatuses 72 (a pair shown in FIGS. 5 and 6 and one shown in FIG. 10) are operable to mechanically modulate the radial positions of a plurality of shroud segments 78 making up the casing shroud to control the clearance G the entire 360 degrees around the rotor blade tips 76A and the stationary casing 74.

Each clearance control apparatus 72 includes one or more shroud segments 78, each having an elongated arcuate-shaped body. The shroud segments 78 define successive circumferential portions of a casing shroud and are separate from and spaced radially inwardly of the casing 74. In addition to the shroud segments 78, each clearance control apparatus 72 includes at least one and preferably a pair of mounting structures in the form of cylindrical bosses 80 formed on the casing 74, at least one and preferably a pair of shroud segment positioning mechanisms 82, and an actuating means 84 operable for actuating the positioning mechanisms 82. The mounting bosses 80 are integral with the casing 74, and define respective passages 86 extending between the outer, or exterior, side and the inner, or interior, side of the casing 74. Also, the mounting bosses 80 are spaced radially outwardly from the shroud segments 78, and project outwardly from the exterior side of the casing.

Each positioning mechanism 82 of the apparatus 72 is supported by one of the stationary casing bosses 80 and is coupled to one or more shroud segments 78 via a shroud holder 88. The positioning mechanism 82 is actuatable for moving the shroud segment 78 via the shroud holder 88 toward and away from the rotor axis A to respective inner and outer positions relative to the rotor at which corresponding desired maximum and minimum clearances are established between the shroud segment 78 and rotor blade tips 76A. The actuating means 84 is coupled to the positioning mechanism 82 and operable for actuating the positioning mechanism 82 to move the shroud segment 78 via the shroud holder 88 solely to one or the other of the inner and outer positions thereof.

More particularly, each of the positioning mechanisms 82 includes a support member 90. The support member 90 is in the form of an elongated shaft mounted through the passage 86 of a respective one of the bosses 80 for radial sliding movement relative thereto and toward and away from the central axis A of the engine and the rotor thereof. The support shaft 90 has an inner end portion 90A pivotally coupled to the shroud holder 88 by a connecting pivot pin 92 and disposed at the interior side of the casing 74. The portion of the support shaft 90 extending through the passage 86 of the boss 80 is in the form of an elongated solid bar of generally cylindrical cross-sectional shape and has a longitudinal axis R which extends in the radial direction.

Figure 6:
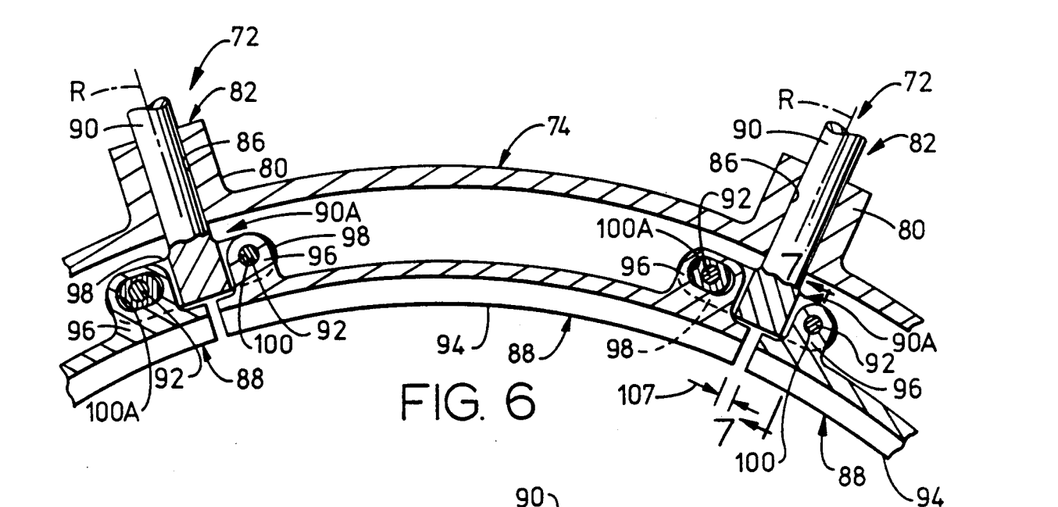
FIG. 6 is an enlarged circumferential sectional view of the apparatus taken along line 6—6 of FIG. 5.
Figure 7:
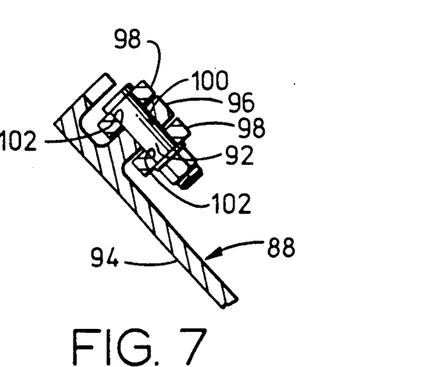
FIG. 7 is a fragmentary sectional view of the apparatus taken along line 7—7 of FIG. 6.
Figure 8:
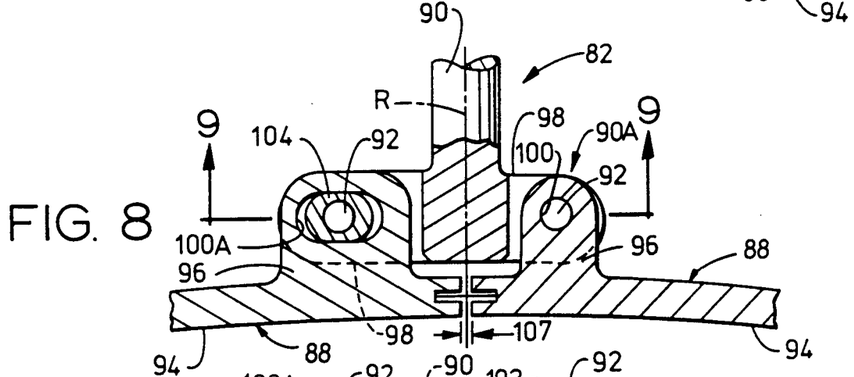
FIG. 8 is an enlarged fragmentary elevational view of the apparatus shown in FIG. 6.
Figure 9:
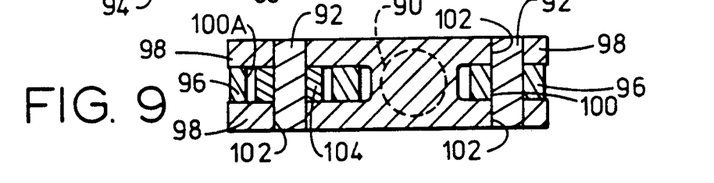
FIG. 9 is a circumferential sectional view of the apparatus taken along line 9—9 of FIG. 8.

The shroud holder 88 is located at the interior side of the casing 74 adjacent the shroud segment 78. The shroud holder 88 has an elongated arcuate-shaped body 94 with pairs of lugs 96 formed on its opposite ends. The shroud holder 88 is pivotally connected by the pivot pins 92 to the inner ends 90A of the support members 90 of the respective positioning mechanisms 82 of a circumferentially-spaced pair of the apparatuses 72, as seen in FIG. 6. More particularly, as seen in FIGS. 7-9, the lugs 96 of the shroud holder 88 extend between the pairs of transversely spaced tabs 98 which are formed on and extend in opposite directions from the inner end 90A of each shaft 90. The pins 92 extend through holes 100 formed in the shroud holder lugs 96 and through aligned openings 102 formed in transversely spaced tabs 98 on the shaft inner ends 90A. The hole 100A through one of the pair of shroud holder lugs 96 has an oblong cross-sectional configuration, and an oblong bushing 104 is fitted over the one pin 92 and inserted within the oblong hole 100A.

Figure 10:
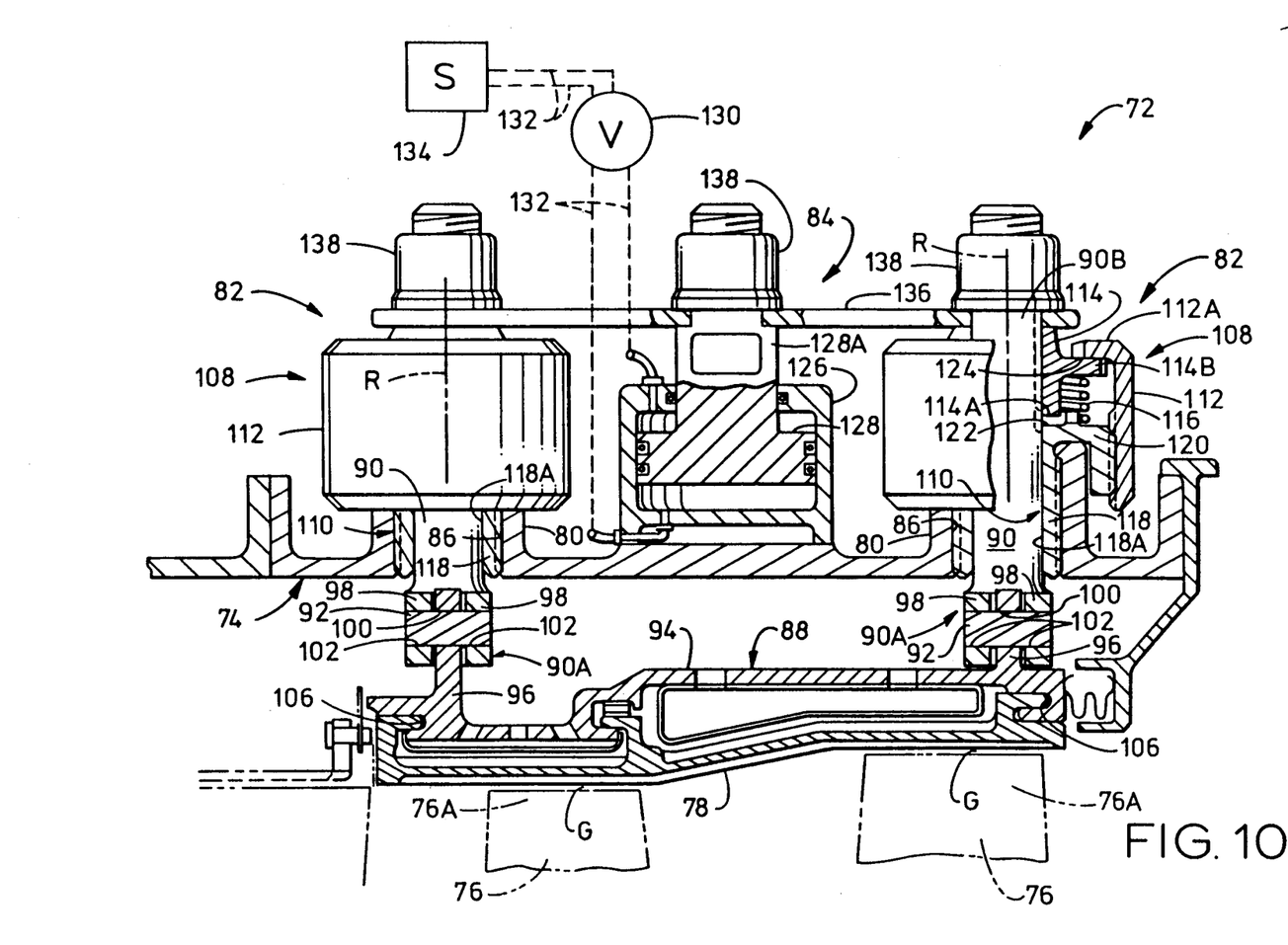
FIG. 10 is an enlarged longitudinal view of the apparatus as seen along line 10—10 of FIG. 5.

The shroud holder body 94 also has a pair of axially-spaced circumferentially-extending grooves 106 which face toward one another for slidably receiving and removably holding the shroud segment 78 at spaced longitudinal edge portions thereof, as best seen in FIG. 10. The narrow space 107 between the shroud holders 88 at their adjacent ends and the oblong shape of the one hole 100A in one lug 96 accommodates the change in the circumference of the shroud formed by the shroud segments 78 as they move radially toward and away from the rotor blade tips 76A. In FIG. 6, it can be seen that each shaft 90 is shared by two adjacent shroud holders 88.

Referring to FIG. 10, each positioning mechanism 82 also includes means, generally designated 108, for defining inner and outer stops. The components of the stops defining means 108 are coupled to a respective one of the bosses 80 and to an outer end portion 90B of the support member shaft 90 and located at the exterior side of the casing 74. The components of the stops defining means 108 include an annular member 110, an annular collar 112 and an annular abutment member 114. The annular member 110 is adjustably attached, such as by threading, to a respective one of the mounting bosses 80, the annular collar 112 is adjustably attached to the annular member 110, and the annular abutment member 114 is adjustably attached to the outer end portion 90B of the support member 90. Also, biasing means 116 in the form of a coil spring is disposed between the abutment member 114 and the annular member 110 for biasing the support member 90 and the shroud holder 88 and shroud segment 78 therewith to an outer position, being shown in FIG. 10, in which the shroud segment 78 is provided at maximum clearance G with the rotor blade tips 76A.

The annular member 110 includes a tubular body 118 having external threads threadably intermeshed with internal threads on the boss 80 for attaching the member 110 to the boss 80. The tubular body 118 defines an interior bearing surface 118A slidably engaged by the support member shaft 90, and an annular flange 120 which defines an inner stop at 122. The flange 120 is attached to and projects outwardly from the outer end of the tubular body 118. The annular member 110 is thereby threadably movable radially relative to the mounting boss 80 to the position shown in FIG. 10 for presetting the location of the inner stop 122.

The collar member 112 has an annular outer rim 112A spaced from the annular flange 120 of the annular member 110 and defining an outer stop 124. The collar member 112 has internal threads threadably intermeshed with external threads on the flange 120 for adjustably attaching the collar member 112 thereon and permitting adjustable movement thereof radially relative to the flange 120 for presetting the location of the outer stop 124. The annular abutment member 114 is threadably attached to the support member shaft outer end portion 90B and thereby adjustably movable radially therealong and relative to the mounting boss 80 for presetting the respective displaced points at which respective inner annular end portion 114A and outer shoulder portion 114B of the abutment member 114 respectively engage the inner and outer stops 122 and 124. In such manner, the minimum and maximum clearances between the shroud segment 78 and rotor blade tips 76A can be preset. The coil spring 116 normally yieldably biases the abutment member 114 and thereby the support member shaft 90 therewith to move radially away from the inner stop 122 and toward the outer stop 124 and thereby to move the shroud segment 78 toward the outer position, as seen in FIG. 10, in which it is at maximum clearance with the rotor blade tips 76A.

The actuating means 84 of the apparatus 72 includes a hollow fluid cylinder 126 attached on the stationary casing 74, and a cylindrical piston 128 mounted in the cylinder 126 for movement between first and second radially-displaced positions. The actuating means 84 also includes means in the form of a valve 130 and conduits 132 for connecting a source 134 of pressurized fluid to the cylinder 126 and being operable for supplying pressurized fluid thereto for moving the piston 128 to one or the other of the first and second positions. A link 136 connects a rod end 128A of the piston 128 to the outer end 90B of the support members 90 of the positioning mechanisms 82. Nuts 138 fastened on the support member shaft outer ends 90B and on the piston rod end 128A retain the link 136 in its interconnecting relation with the piston 128 and support members 90. Thus, the support members 90 are moved toward and away from the rotor axis A and the shroud holder 88 and shroud segment 78 are moved therewith to the respective inner and outer positions by movement of piston 128 to the respective first and second positions. In FIG. 10, the piston 128 is shown at its second position and the shroud segment 78 is shown at its outer position.

In summary, the positioning mechanisms 82 of each of the apparatuses 72 are mechanically and hydraulically coupled together and operable for radially moving the shroud holder 88 and shroud segment 78 therewith toward and away from the rotor blade tips 76A to outer and inner positions relative to the rotor (not shown) at which corresponding maximum and minimum clearances are established between the shroud segments 78 and the rotor blade tips 76A. Further, the mechanisms 82 will hold the shroud segment 78 at one or the other of the outer and inner position to maintain at one or the other of the corresponding maximum or minimum clearance between the shroud segment and the rotor blade tips.

A conventional modulation control system (not shown) having clearance and engine maneuver loading sensors can be used for operating the control valves 130 to actuate the pistons 128 within the cylinders 126 for changing between maximum and minimum clearances in the manner described earlier. Since the control system and the components associated therewith form no part of the present invention, a detailed discussion of them is not necessary for understanding the clearance control apparatus 10 of the present invention.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. In a gas turbine engine including a rotatable rotor having a central axis and a row of blades with outer tips and a stationary casing with a shroud disposed in concentric relation with said rotor, an apparatus for controlling the clearance between said rotor blade tips and casing shroud, said apparatus comprising:
(a) a shroud segment defining a circumferential portion of said casing shroud and being separate from and spaced radially inwardly of said casing;
(b) at least one mounting structure on said stationary casing defining a passage between exterior and interior sides of said casing, said mounting structure being spaced radially outwardly from said shroud segment;
(c) a shroud segment positioning mechanism supported by said mounting structure, coupled to said shroud segment, and being actuatable for moving said shroud segment toward and away from said rotor axis to respective inner and outer positions relative to said rotor at which corresponding desired minimum and maximum clearances are established between said shroud segment and rotor blade tips; and
(d) means coupled to said positioning mechanism and being operable for actuating said positioning mechanism to move said shroud segment solely to one or the other of said inner and outer positions thereof;
(e) said positioning mechanism including
(i) a support member mounted through said passage defined by said mounting structure for radial movement relative thereto and toward and away from said rotor axis, said support member having a longitudinal axis and opposite inner and outer end portions, said shroud segment being coupled to said inner end portion of said support member at said interior side of said casing, and
(ii) means for defining inner and outer stops being coupled to said mounting structure and said outer end portion of said support member and located at said exterior side of the casing.

2. The apparatus as recited in claim 1, wherein:
said mounting structure is a cylindrical boss formed on said casing, defining said passage, and projecting from said exterior side of said casing; and
said support member is a cylindrical shaft mounted through said passage of said boss for slidable movement toward and away from said rotor axis relative to said boss.

3. The apparatus as recited in claim 1, further comprising:
a shroud holder connected to said inner end portion of said support member and supporting said shroud segment.

4. The apparatus as recited in claim 3, wherein said shroud holder has means defined at spaced longitudinal edge portions thereof for receiving and holding said shroud segment.

5. The apparatus as recited in claim 4, wherein said receiving and holding means are axially-spaced circumferentially-extending grooves defined at spaced longitudinal edge portions of said shroud holder.

6. The apparatus as recited in claim 1, wherein said inner and outer stop defining means includes an annular member having an annular flange defining said inner stop and projecting outwardly from said mounting structure, said annular member being attached to said mounting structure so as to preset the location of said inner stop.

7. The apparatus as recited in claim 6, wherein said annular member also has a tubular body extending through said passage of said mounting structure and defining an interior bearing surface slidably engaged by said support member, said annular flange being attached to and projecting outwardly from an outer end of said tubular body.

8. The apparatus as recited in claim 6, wherein said inner and outer stop defining means also includes an annular collar member adjustably attached to said flange of said annular member and having an annular outer rim spaced from said flange to define said outer stop, said collar member being adjustably movable radially relative to said flange for presetting the location of said outer stop.

9. The apparatus as recited in claim 7, wherein said inner and outer stop defining means further includes an annular abutment member adjustably attached to said support member and having portions aligned with said inner and outer stops said abutment member being adjustably movable radially along said support member and relative to said mounting structure for presetting the respectively displaced points at which said portions of said abutment member engage said inner and outer stops upon movement of said support member toward and away from said rotor axis and thereby for presetting the minimum and maximum clearances between said shroud segment and rotor blade tips.

10. The apparatus as recited in claim 9, wherein said inner and outer stop defining means further includes means disposed between and engaging said inner stop and said abutment member for yieldably biasing said abutment member and thereby said support member therewith to move away from said inner stop and toward said outer stop and thereby move said shroud segment toward said outer position in which it is at maximum clearance with said rotor blade tips.

11. The apparatus as recited in claim 10, wherein said biasing means is a coil spring.

12. The apparatus as recited in claim 1, wherein said actuating means includes:
a fluid cylinder attached on said stationary casing;
a piston mounted in said cylinder for movement between first and second radially-displaced positions;
means for connecting a source of pressurized fluid to said cylinder and being operable for moving said piston to one or the other of said first and second positions; and
a link connecting said piston to said support member such that said support member is moved toward and away from said rotor axis and said shroud segment is moved therewith to said respective inner and outer positions by movement of said piston to said respective first and second positions.

13. In a gas turbine engine including a rotatable rotor having a central axis and a row of blades with outer tips and a stationary casing with a shroud disposed in concentric relation with said rotor, an apparatus for controlling the clearance between said rotor blade tips and casing shroud, said apparatus comprising:
(a) a shroud segment defining a circumferential portion of said casing shroud and being separate from and spaced radially inwardly of said casing;
(b) a shroud holder supporting said shroud segment;
(c) a pair of axially-spaced mounting structures on said stationary casing defining passages between exterior and interior sides of said casing, said mounting structures being spaced radially outwardly from said shroud segment and holder;

(d) a pair of shroud segment positioning mechanisms supported by said respective mounting structures, coupled to said shroud holder at axially spaced locations, and being actuatable for moving said shroud holder and shroud segment therewith toward and away from said rotor axis to respective inner and outer positions relative to said rotor at which corresponding desired minimum and maximum clearances are established between said shroud segment and rotor blade tips; and (e) means coupled to said positioning mechanisms and being operable for actuating said positioning mechanisms to move said shroud segment solely to one or the other of said inner and outer positions thereof.

14. The apparatus as recited in claim 13, wherein each of said positioning mechanisms includes:

a support member mounted through said passage defined by a respective one of said mounting structures for radial movement relative thereto and toward and away from said rotor axis, said support member having a longitudinal axis and opposite inner and outer end portions, said shroud holder being coupled to said inner end portion of said support member at said interior side of said casing; and means for defining inner and outer stops being coupled to said respective one mounting structure and said outer end portion of said support member and located at said exterior side of the casing.

15. The apparatus as recited in claim 14, wherein:

each of said mounting structures is a cylindrical boss formed on said casing, defining said passage, and projecting from said exterior side of said casing; and each of said support members is a cylindrical shaft mounted through said passage of a respective one of said bosses for slidable movement toward and away from said rotor axis relative to said boss.

16. The apparatus as recited in claim 14, wherein said inner and outer stop defining means includes an annular member having an annular flange defining said inner stop and projecting outwardly from said mounting structure, said annular member being attached to said mounting structure so as to preset the location of said inner stop.

17. The apparatus as recited in claim 16, wherein said annular member also has a tubular body extending through said passage of said respective one mounting structure and defining an interior bearing surface slidably engaged by said support member, said flange being attached to and projecting outwardly from an outer end of said tubular body.

18. The apparatus as recited in claim 16, wherein said inner and outer stop defining means also includes an annular collar member adjustably attached to said flange of said annular member and having an annular outer rim spaced from said flange to define said outer stop, said collar member being adjustably movable radially relative to said flange for presetting the location of said outer stop.

19. The apparatus as recited in claim 18, wherein said inner and outer stop defining means further includes an annular abutment member adjustably attached to said support member and having portions aligned with said inner and outer stops, said abutment member being adjustably movable radially along said support member and relative to said respective one mounting structure for presetting the respectively displaced points at which said portions of said abutment member engage said inner and outer stops upon movement of said support member toward and away from said rotor axis and thereby for presetting the minimum and maximum clearances between said shroud segment and rotor blade tips.

20. The apparatus as recited in claim 19, wherein said inner and outer stop defining means further includes means disposed between and engaging said inner stop and said abutment member for yieldably biasing said abutment member and thereby said support member therewith to move away from said inner stop and toward said outer stop and thereby move said shroud segment toward said outer position in which it is at maximum clearance with said rotor blade tips.

21. The apparatus as recited in claim 20, wherein said biasing means is a coil spring.

22. The apparatus as recited in claim 14, wherein said actuating means includes:

a fluid cylinder attached on said stationary casing;

a piston mounted in said cylinder for movement between first and second radially-displaced positions;

means for connecting a source of pressurized fluid to said cylinder and being operable for moving said piston to one or the other of said first and second positions; and a link connecting said piston to said support member such that said support member is moved toward and away from said rotor axis and said shroud segment is moved therewith to said respective inner and outer positions by movement of said piston to said respective first and second positions.

* * * * *